US010593126B2

(12) United States Patent
Ishiguro et al.

(10) Patent No.: US 10,593,126 B2
(45) Date of Patent: Mar. 17, 2020

(54) VIRTUAL SPACE DISPLAY SYSTEM

(71) Applicant: National University Corporation Nagoya University, Nagoya-shi, Aichi-ken (JP)

(72) Inventors: Yoshio Ishiguro, Nagoya (JP); Shimpei Kato, Nagoya (JP); Kenjirou Yamada, Nagoya (JP)

(73) Assignee: National University Corporation Nagoya University, Nagoya-shi (JP)

( * ) Notice: Subject to any disclaimer, the term of this patent is extended or adjusted under 35 U.S.C. 154(b) by 0 days.

(21) Appl. No.: 16/105,738

(22) Filed: Aug. 20, 2018

(65) Prior Publication Data

US 2018/0357836 A1    Dec. 13, 2018

Related U.S. Application Data

(63) Continuation of application No. PCT/JP2017/005677, filed on Feb. 16, 2017.

(30) Foreign Application Priority Data

Feb. 18, 2016 (JP) .................................. 2016-028809
Jan. 12, 2017 (JP) .................................. 2017-003240

(51) Int. Cl.
*G06T 19/20* (2011.01)
*G06F 3/01* (2006.01)
(Continued)

(52) U.S. Cl.
CPC ............. *G06T 19/20* (2013.01); *B60W 30/00* (2013.01); *G06F 3/011* (2013.01); *G06F 3/012* (2013.01);
(Continued)

(58) Field of Classification Search
CPC ............ G06T 19/20; G06T 2219/2016; G05D 1/0214; G05D 1/0231
(Continued)

(56) References Cited

U.S. PATENT DOCUMENTS

2013/0083061 A1*  4/2013  Mishra .................. H04N 5/265
                                                    345/633
2013/0181823 A1*  7/2013  Stahlin ................ B60K 35/00
                                                    340/436
(Continued)

FOREIGN PATENT DOCUMENTS

JP    2008-230296    10/2008
JP    2013-257716    12/2013

OTHER PUBLICATIONS

International Search Report from International Application No. PCT/JP2017/005677 dated Apr. 25, 2017.
(Continued)

*Primary Examiner* — Jin Ge
(74) *Attorney, Agent, or Firm* — Beyer Law Group LLP

(57) ABSTRACT

A virtual space display system for a self-driving moving body displays a virtual space different from a real environment such that a passenger on the moving body can enjoy the virtual space without feeling strange for a motion. The system includes a display device, a surrounding situation detector, and a virtual space display unit. The surrounding situation detector obtains information specifying features that influence a path along which the moving body is to move, and specifies such an important feature among features located in the surrounding of the moving body that presence/absence of the important feature has an influence on the path of the moving body. The virtual space display unit converts the important feature into an object that is fit for the influence on the path of the moving body based on a predetermined rule, and causes the display device to display the virtual space including the converted object.

14 Claims, 10 Drawing Sheets

(51) Int. Cl.
  *B60W 30/00* (2006.01)
  *G06K 9/00* (2006.01)
  *G05D 1/02* (2020.01)

(52) U.S. Cl.
  CPC ....... *G06K 9/00671* (2013.01); *G05D 1/0214* (2013.01); *G05D 1/0231* (2013.01); *G06F 2203/011* (2013.01); *G06F 2203/012* (2013.01); *G06K 9/00791* (2013.01); *G06T 2219/2016* (2013.01)

(58) Field of Classification Search
  USPC .......................................................... 345/681
  See application file for complete search history.

(56) References Cited

U.S. PATENT DOCUMENTS

| | | | |
|---|---|---|---|
| 2013/0293586 A1* | 11/2013 | Kaino | G08G 1/005 345/633 |
| 2013/0328928 A1 | 12/2013 | Yamagishi et al. | |
| 2014/0019005 A1* | 1/2014 | Lee | G08G 1/166 701/36 |
| 2014/0111647 A1* | 4/2014 | Atsmon | H04N 7/185 348/148 |
| 2014/0364212 A1* | 12/2014 | Osman | A63F 13/213 463/31 |
| 2015/0100179 A1* | 4/2015 | Alaniz | A63F 13/00 701/1 |
| 2015/0103174 A1* | 4/2015 | Emura | B60R 1/00 348/148 |
| 2015/0321606 A1* | 11/2015 | Vartanian | G02B 27/0101 348/148 |
| 2016/0184703 A1* | 6/2016 | Brav | G06F 3/012 463/30 |
| 2016/0214016 A1* | 7/2016 | Stafford | G06F 3/04815 |
| 2016/0379413 A1* | 12/2016 | Yamamoto | G06T 19/006 345/427 |
| 2017/0103574 A1* | 4/2017 | Faaborg | G02B 27/0172 |
| 2017/0236328 A1* | 8/2017 | Eatedali | G01C 21/3697 345/633 |
| 2018/0154860 A1* | 6/2018 | Thieberger | B60R 21/36 |

OTHER PUBLICATIONS

Japanese Office Action from Japanese Application No. 2017-003240 dated Apr. 10, 2017.

Koge et al. "Car as a Motion Platform for VR Environment", Proceedings of the Virtual Reality Society of Japan, Annual Conference, Sep. 11, 2015, pp. 400 to 401.

* cited by examiner

VIRTUAL SPACE DISPLAY SYSTEM

CLAIM OF PRIORITY

This application is a Continuation of International Patent Application No. PCT/JP2017/005677, filed on Feb. 16, 2017, which claims priority to Japanese Patent Application No. 2016-028809, filed on Feb. 18, 2016 and Japanese Patent Application No. 2017-003240, filed on Jan. 12, 2017, each of which is hereby incorporated by reference.

BACKGROUND OF THE INVENTION

1. Field of the Invention

The present disclosure relates to a technique of providing a passenger on a self-driving moving body with display of a virtual space that is different from a real environment surrounding the moving body.

2. Description of the Related Art

The technologies with regard to automatic driving of vehicles have recently achieved remarkable development. Automatic driving at the level of autonomous driving including an operation to change the moving direction, as well as speed control and an emergency stop of the vehicle has recently been achieved and become closer to practical use.

The automatic driving of the vehicle is substantially implemented by the following technologies. Various sensors including a GPS (Global Positioning System) and sensors detecting surrounding features using laser and a camera are mounted on the vehicle. A control device of automatic driving uses these sensors to detect the position and the attitude of the vehicle and surrounding features. The control device compares the results of detection with a three-dimensional map of high accuracy provided in advance and specifies the position and the attitude of the vehicle with high accuracy. The control device also specifies features which the own vehicle is to avoid, for example, pedestrians and oncoming vehicles, among the surrounding features. The control device then controls the speed and the moving direction of the vehicle, based on these various pieces of detected and specified information.

During automatic driving, the driver is essentially expected to be allowed to direct the attention to something other than driving. For example, the driver is not required to fix the eyes on the front but is expected to have no problem when directing the attention to something other than driving, for example, game or reading. Even when automatic driving is achieved, when there is a risk of a crash due to a failure of the sensor or the control device of the vehicle, the driver is required to drive the vehicle and avoid the risk. When the control device of automatic driving changes the moving direction to avoid a risk while the vehicle goes straight ahead monotonously, the driver who does not grasp the outside situation recognizes that the vehicle has an unexpected motion and feels significantly uneasy. In the present state of automatic driving, the driver is not allowed to fully direct the attention to anything other than driving, due to the safety awareness and the discomfort due to a failure to understand the motion of the vehicle.

A countermeasure against the foregoing prevents the driver from visually checking the situation surrounding the vehicle, for example, by mounting a head mount display on the driver and enables the driver to enjoy something other than driving, for example, a game or reading. Techniques have also been developed to provide the passenger or more specifically the driver of a general vehicle as well as the automatic driving with various information by display. For example, Japanese Patent Application Publication No. JP 2008-230296A discloses a technique of emphatically displaying features such as pedestrians and other vehicles on a head mount display which the driver of the vehicle wears.

BRIEF DESCRIPTION OF THE INVENTION

This method may, however, cause the driver to suffer from motion sickness due to a difference between the displayed image and the driver's own feeling of a motion of the vehicle. For example, in the case where a self-driving vehicle detects an obstacle and changes the moving direction to avoid the obstacle, unless such an obstacle is reflected in the displayed image provided to the driver, the driver recognizes an unexpected motion against the driver's expectation of going straight ahead and thereby has a feeling of remarkable strangeness.

This problem is not characteristic of the vehicle but is commonly found in self-driving moving bodies such as airplanes, boats and ships. This problem is also not characteristic of automatic driving but is also found in the case where a person is on a moving body driven by another person. Moreover, this problem is found in the case where a person who wears a head mount display, for example, drives an ordinary moving body or walks.

By taking into account the above problem, the present disclosure aims to suppress a person who views a displayed virtual space from feeling strange. Additionally, the present disclosure aims to enable a passenger on a self-driving moving body or a moving body driven by another person to enjoy an event other than driving without feeling strange for a motion of the moving body which the passenger experiences.

According to one aspect of the present disclosure, there is provided a virtual space display system that provides a person with display of a virtual space that is different from a real environment surrounding the person. The virtual space display system comprises a display device configured to provide the person with the display of the virtual space; a surrounding situation detector configured to specify an important feature, presence of which has an influence on the person's feeling of motion during a movement of the person or has an influence on the person's expectation of a movement of the person, among features located in the surrounding of the person; and a virtual space display unit configured to convert the important feature into an object that is fit for the influence on the feeling or the expectation, based on a predetermined rule, and to cause the display device to display the virtual space including the converted object.

The above aspect of the present disclosure specifies the important feature that has an influence on the feeling of motion which the person using the display device to view the virtual space feels during the person's own movement or has an influence on the expectation of the person's own movement. For example, when an obstacle is present in front of the person, the person tries to avoid the obstacle. This obstacle is accordingly specified as an important feature. When a building is present beside the person, on the other hand, the moving direction of the person is not changed by the presence/absence of the building, so that the building is excluded from the important feature. A bump on the road surface on which the person moves has an influence on the person's feeling of motion and is accordingly specified as an important feature. The important feature is specified by the presence/absence of the influence on the person's feeling or on the person's expectation of the motion.

In the above aspect of the present disclosure, the person means a person who is moving by some means, for example, a person on a self-driving moving body or on a moving body driven by another person, a person who drives an ordinary moving body, or a person who walks.

Various methods may be employed to specify the important feature. One available method may specify each feature that is located within a predetermined range in the moving direction of the person, as an important feature. Another available method may detect the moving speed and the moving direction of each feature, estimate whether the feature collides with the person and specify the feature expected to collide with the person, as an important feature. Another available method may specify a predetermined level or higher level of undulation or bump on the road surface, as an important feature.

The display device used to display the virtual space may be any of various devices, for example, a display placed to cover a major part of the person's field of view, a head mount display which the person wears or an eyeglasses-type display.

The displayed virtual space may be anything that is different from the real environment surrounding the person and may be, for example, a virtual space for entertainment such as game, display of reading, TV, a video or a movie, or a communication video with another person or with other people, such as a video phone or a teleconference. There is, however, no need to completely exclude the real space, and the virtual space may be generated by using the real space, for example, by processing an image of the surrounding of the person.

The aspect of the present disclosure converts the important feature specified as described above into an object that is fit for the influence on the person's feeling or the person's expectation and displays the converted object. Each important feature which the moving body is supposed to avoid, for example, a pedestrian or a parked vehicle is not converted into an object such as grass that is expected to cause no problem when the person goes straight but is converted into an object such as a rock or a hole that urges the person to avoid. The size of the object may be determined according to the influence.

For example, a procedure of conversion into an object may provide in advance a conversion database that stores a large number of objects and appropriately select an object from the conversion database. Another procedure may generate an object by processing an image of the important feature.

The aspect of the present disclosure provides such a display and thereby causes the person's feeling of motion which the person actually feels during a movement or the person's expectation of a movement to match with the moving state which the person visually recognizes by the converted object such as a rock or a hole in the virtual space. As a result, this prevents the person who views the virtual space from feeling strange for the person's own motion.

The important feature is not directly displayed but is converted into an object to be displayed. Selecting an object fit for the virtual space enables the person to recognize the person's own motion without feeling strange as an event in the virtual space. As a result, this enables the person to be absorbed in the virtual space without causing the person to wonder what happens in the real world. This, on the contrary, causes the motion of the person in the real world to be fit for the person's feeling in the real world and thereby provides an advantage of improving the reality of the virtual space.

In a virtual space display having little requirement for improving the reality, such as reading or a teleconference, unlike the entertainment such as game, it is preferable to display a changing scenery or a road in a lower part of the screen, with a view to causing the person to recognize the person's own motion in the real world. Appropriately placing an object converted from an important feature during such a display provides the advantageous effects of the present disclosure.

In the above aspect of the present disclosure, the display device may be one of a wearable display device which the person wears and an immersive display device.

An example of the wearable display device is a head mount display. The wearable display device is, however, not limited to the configuration of providing a display on some device but may be configured to cause a person to recognize an image by directly irradiating the human's eyeballs with light. Examples of the immersive display device are a system called CAVE, a planar or curved large screen display provided ahead of a person and a system of multidirectional display including a lateral side and upper side of a person other than a front side.

Using such a display device facilitates a person to feel integrated with the virtual space. Accordingly, the person is likely to feel strange due to a difference between the person's recognition of a motion by visual information and the person's actual feeling or expectation of the motion. The present disclosure is thus useful for such display devices.

In the above aspect of the present disclosure, the person may be a passenger of a self-driving moving body or of a moving body driven by another person, and the important feature may be a feature, presence of which has an influence on a path along which the moving body moves.

In this case, when the path of the moving body changes, the passenger feels the motion. The path of the change may also have an influence on the motion expected from the display of the virtual space viewed by the passenger. Accordingly, a feature that has an influence on the path of the moving body is specified as an important feature since it has an influence on the passenger's feeling of motion which the passenger feels during the passenger's own movement or has an influence on the passenger's expectation of the passenger's own movement. Various methods may be employed to specify the important feature. In the above aspect, for example, the moving body detects the presence of a surrounding feature and determines the path. An available method may thus specify an important feature by receiving information that specifies a feature having an influence on the path. Another available method may specify each feature that is located within a predetermined range in the moving direction of the moving body, as an important feature. Another available method may detect the moving speed and the moving direction of each feature, estimate whether the feature collides with the moving body and specify the feature expected to collide with the moving body, as an important feature.

When the person is on a moving body, the person is moved independently of the person's own intention and is thus likely to feel strange for the person's own feeling or expectation of the motion.

Such display according to this aspect of the present disclosure enables the moving state which the passenger is conscious of by looking at a converted object such as a rock or a hole in the virtual space to match with the path determined by the moving body in response to detection of a pedestrian or the like in the real world. While the moving body moves irrespective of the passenger's intention, this aspect of the present disclosure accordingly provides the passenger with a display explaining the motion. As a result, this prevents the passenger viewing the virtual space from feeling strange for the motion of the moving body. This is because the passenger understands the reason for the path to be taken by the moving body by recognition in the virtual space, and the moving body moves along the passenger's understanding.

As described above, the present disclosure is especially effective for the passenger on the moving body.

Examples of the self-driving moving body include vehicles, airplanes and boats and ships. There are various technical levels of automatic driving. In the description hereof, the self-driving moving body means a moving body having a function of automatically selecting or determining at least the path of the moving body, i.e., the moving path, irrespective of the passenger's intention. In this case, various methods may be employed to determine the path. An available method causes the moving body to select an optimum path among a plurality of paths set in advance. Another available method allows the moving body to autonomously determine the path according to changing conditions without any paths provided in advance or without any restrictions. Another available method causes the moving body to move along a path set in advance but allows the moving body to deviate from the path in the case of an emergency.

The moving body is provided with a control device configured to determine the path. This control device may be mounted directly on the moving body or may be configured as a remote-control device of the moving body.

In the virtual space display system of the present disclosure, the surrounding situation detector may specify a feature that has an influence on a moving speed of the person, as the important feature.

Examples of this type of important feature include features to stop, such as traffic lights and railroad crossings and features to reduce the speed such as speed limit signs and narrow roads when the person is on the moving body.

Including such features in the important features enables the passenger to understand the reason of a speed change of the moving body by recognition in the virtual space and further reduces the passenger's feeling of strangeness. This also improves the reality of the virtual space.

In the virtual space display system of the present disclosure, the important feature may be a feature with an appearance having a change in such a manner that has an influence on the feeling or the expectation, and the virtual space display unit may predict or detect the change and display the virtual space including the object with the predicted or detected change reflected on an appearance or a position of the object.

A change in appearance means a change in shape, size, color or the like. The important features include those having an influence on the path. When the moving body is a vehicle, one example of the important feature that changes the shape is a crossing bar on a railroad crossing. One example of the important feature that changes the color is a traffic light. In the case of an airplane, one example of the important feature that changes the size is developing cumulonimbus.

The above aspect causes such a change of the appearance to be reflected on the appearance or the position of the object. For example, when a crossing bar is expressed by an object of a gate, a closed gate represents the state that the crossing bar comes down, and an open gate represents the state that the crossing bar goes up. This causes the influence of the important feature on the path to be reflected on the object. The reflection on the object is not limited to the change of the shape but may be a change in position of the object. For example, a red traffic light may be expressed by a rock that is present in front of the moving body, and a green traffic light may be expressed by the rock rolling and moving to be passable.

The change of the appearance of the important feature may be a regular change or may be an irregular change. In the case of a regular change such as a traffic light, the object in the virtual space may be changed regularly. This enables a change of the important feature to be reflected in the virtual space relatively easily. This method may, however, cause a problem that a change of the object may not completely match with a change in the real world. For example, while a traffic light is not changed from red to green in the real world, the display in the virtual space is changed to the passable state after elapse of a predetermined time period. The passenger is, however, not forced to start moving at the moment when the display in front of the passenger is changed to the passable state. The time difference between the real world and the virtual space may thus be in an allowable range of a feeling of strangeness for the passenger.

In the case of an irregular change of the important feature or a change from the passable state to the impassable state such as a change from a green traffic light to a red traffic light, on the other hand, there is a need to detect a change of the important feature in the real world and reflect the detected change on a change of the object. For example, a change of the important feature may be detected by various sensors mounted on the moving body or may be detected by a change in motion of the moving body. For example, in the case of detection of a traffic light as an important feature ahead of the moving body along with detection of speed reduction of the moving body, it is determined that the traffic light is changed from green to red. The present disclosure aims to provide the virtual space display that prevents the passenger from feeing strange for the motion of the moving body. It is accordingly sufficient to detect the change of the important feature from the motion of the moving body. This aspect enables a change of the important feature to be relatively readily reflected on the object. Detection of the motion of the moving body is also applicable to the case where a regular change of the important feature such as a change from a red traffic light to a green traffic light is reflected on the object.

In the virtual space display system of the present disclosure, the important feature may be a feature with a position having a change in such a manner that has an influence on the feeling or the expectation, and the virtual space display unit may predict or detect the change and display the virtual space including the object with the predicted or detected change reflected on an appearance or a position of the object.

Features that have an influence on the path are included in the important features. When a person is on a vehicle, examples of the important feature that changes the position, i.e., examples of the moving important feature include pedestrians, bicycles and oncoming vehicles. According to the above aspect, for example, the position of the object may be moved, or the size of an obstacle may be changed, accompanied with a movement of the pedestrian. This provides a display of reducing the feeling of strangeness, for example, for a path of significant detour of the moving body in response to the moving important feature.

The change of the position of the important feature may be estimated, based on detection of the moving direction and the speed of the important feature by sensors mounted on the moving body. Another procedure may detect the path of the moving body and estimate that the important feature is moving to an expected position.

In the case where a moving important feature is expressed by an object, it is preferable to determine the position and the size of the object, such as to provide only one possible option as an ordinary path. For example, when a person is on a vehicle and a pedestrian is expressed by an object of an obstacle such as a hole, the position and the size of the hole may provide two paths going around the hole clockwise and counterclockwise as possible options. Such a display may cause the actual motion of the moving body to differ from the passenger's expectation and may thus cause the passenger to feel strange. In this case, it is preferable to determine the position and the size of a hole, such that an ordinary path is limited to either a clockwise path or a counterclockwise path in conformity to the path along which the moving body actually moves. This reduces the feeling of strangeness in the display.

In the virtual space display system of the present disclosure, the virtual space display unit may convert the important feature into the object by referring to a predetermined correspondence relationship according to a type of the important feature.

For example, pedestrians are consistently converted into holes, and moving vehicles are consistently converted into rocks. Such consistent conversion by certain classification enables the passenger to gradually recognize the correspondence relationships between the objects in the virtual space and the important features in the real world and to understand the real world while viewing the virtual space. Such recognition is especially useful when the passenger is forced to drive the moving body, for example, in the case of an emergency such as a failure. The passenger recognizes the real world to some extent, while viewing the virtual space and is thus allowed to immediately pay attention to driving in the real world.

According to the above aspect, there may be various variations with maintaining the correspondence relationship between the type of the important feature and the object. For example, in the case where a pedestrian is converted into a hole, the size of the hole, the shape of the hole and the surrounding of the hole may be changed according to the sex, the body size and the like of the pedestrian. This provides a diversity of expressions and enables the passenger to enjoy the virtual space display.

In the virtual space display system of the present disclosure, the virtual space display unit may convert at least part of general features that are located in the surrounding of the moving body, in addition to the important feature, into an object according to a predetermined rule and display the virtual space including the converted object.

According to this aspect, general features are also converted into objects according to the rule. For example, buildings may be converted into walls in the virtual space. This has the advantage of relatively readily generating a wide variety of virtual spaces.

As described above, the present disclosure provides a diversity of virtual spaces. As one example, the virtual space may be a play space where the passenger plays.

This is, for example, a space for a game. This enables the passenger to enjoy the movement of the self-driving moving body.

The passenger's motion in the virtual space may be reflected in the virtual space display. In the above play space, for example, the passenger may operate a controller to play. Part of the passenger's motion may be reflected on the movement of the moving body; for example, the moving body may stop suddenly, in response to the passenger's predetermined operation of the controller. This enables the passenger to drive the moving body, for example, in the case of an emergency. When there are a plurality of paths as possible options taken by the moving body, the passenger may select a route through an operation of the controller.

This operation may not be necessarily the controller's operation. For example, a method without using a controller may detect the passenger's motion by a sensor and reflect the detected motion on the virtual space display or on the movement of the moving body. For example, the moving body may stop suddenly when the passenger feels endangered and unconsciously stretches the arms. This allows for more natural and intuitive driving.

The aspects of the present disclosure may not necessarily have all the features described above but may be appropriately configured with omission of some features or in combination with some features. The present disclosure is not limited to the aspects of the virtual space display system but may be implemented by a virtual space display method that causes a computer to display such a virtual space, a computer program configured to implement the functions of virtual space display, and a CD-R, a DVD and other computer readable recording media in which such a computer program is recorded.

DESCRIPTION OF EMBODIMENTS

Embodiment 1

The following describes an embodiment of the present disclosure that uses a vehicle as a self-driving moving body and displays a virtual space on a head mount display which a passenger of the moving body wears. The present disclosure is not limited to automatic driving but is also applicable to a passenger who is on a vehicle driven by another person.

A. System Configuration

Figure 1:
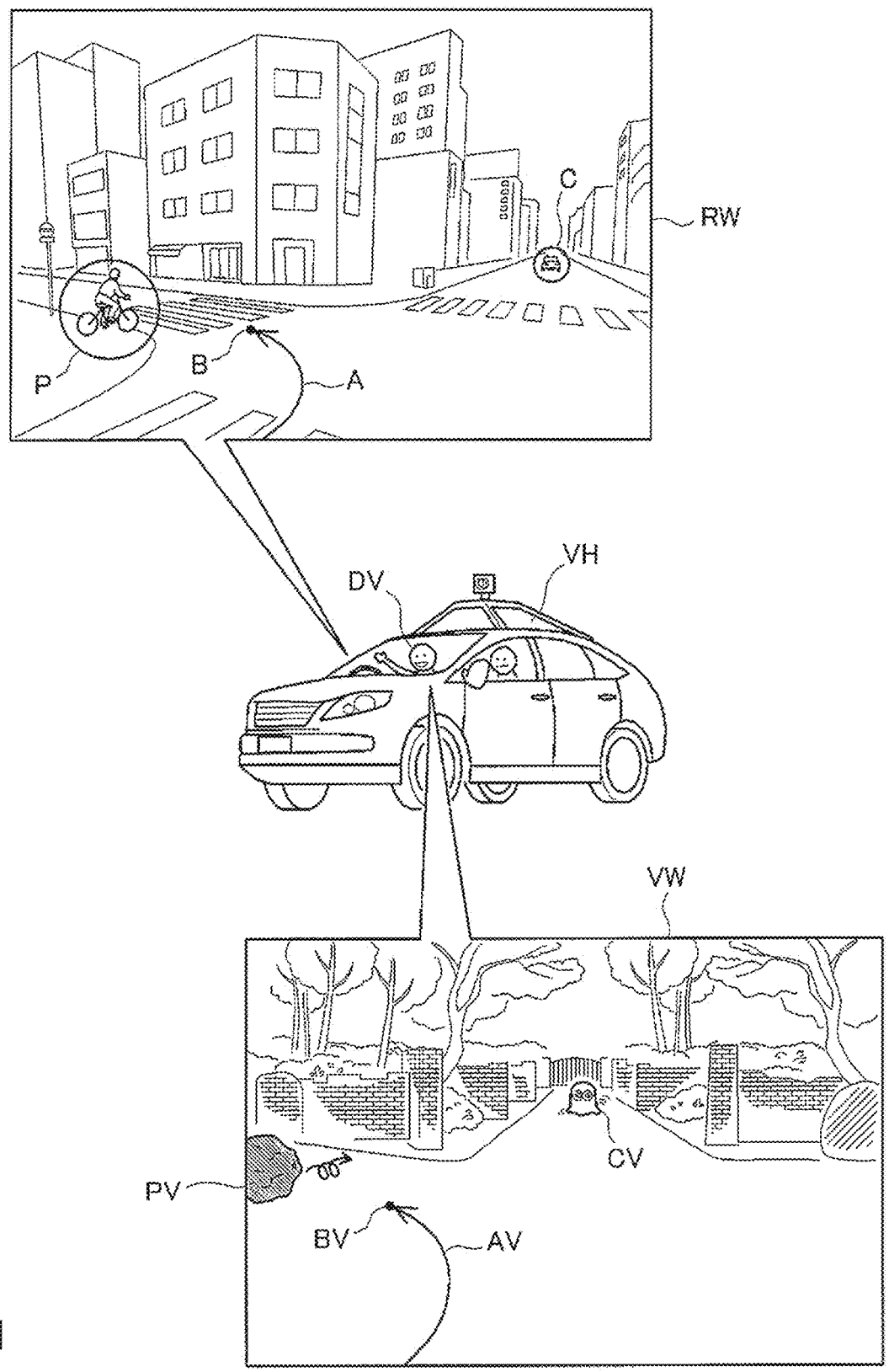
FIG. 1 is a diagram illustrating the outline of virtual space display according to an embodiment.

Virtual space display implemented according to the embodiment is described first. FIG. 1 is a diagram illustrating the outline of virtual space display according to the embodiment.

A vehicle VH with a virtual space display system according to the embodiment mounted thereon is shown in the center of the illustration. The vehicle VH is equipped with a computer and serves to achieve autonomous automatic driving with detecting the vehicle's surroundings by means of a sensor such as a camera. A passenger DV of the vehicle VH wears a head mount display. A virtual space VW shown in the lower part of the illustration is displayed on the head mount display.

The upper part of the illustration shows the situation of a real world RW in which the vehicle VH drives. As illustrated, buildings are present in the real world RW, and the vehicle VH intends to run on a road as shown by an arrow A. An oncoming vehicle C approaches from the front of the vehicle VH. A person on a bicycle P is moving ahead of the vehicle VH after turning left. The vehicle VH runs with recognizing such surroundings and stops at a point B near to the point of the arrow A to avoid a collision with the bicycle P. After the bicycle passes through, the vehicle VH restarts driving.

A screen that allows the passenger DV to play a game is displayed in the virtual space VW. In the illustrated example, the game screen displayed in the virtual space VW is a display reflecting the real world RW. The passenger DV plays a game with moving in this virtual space VW. The screen automatically changes with movement of the camera point of view, irrespective of the passenger DV's intention. In the illustrated situation, the passenger DV intends to move to a left pathway as shown by an arrow AV. The display shows a character CV coming straight from the front center of the game screen. This is an object converted from the oncoming vehicle C in the real world RW. The display also shows a rock PV rolling on the left side. This is an object converted from the bicycle P in the real world RW. In this manner, the configuration of the embodiment converts a feature that has an influence on a path along which the vehicle VH moves, i.e., an important feature, into an object and displays the object in the virtual space VW.

This configuration causes the rolling rock PV to be displayed in front of the passenger DV. Even when the motion is stopped at a point BV in the virtual space VW corresponding to a stop of the self-driving vehicle VH at the point B, this accordingly enables the passenger DV to continue the game without feeling strange. This also enables the passenger DV to experience the motion of the vehicle VH corresponding to a stop of the motion at the point BV on the game screen and thereby improves the reality of the game.

Figure 2:
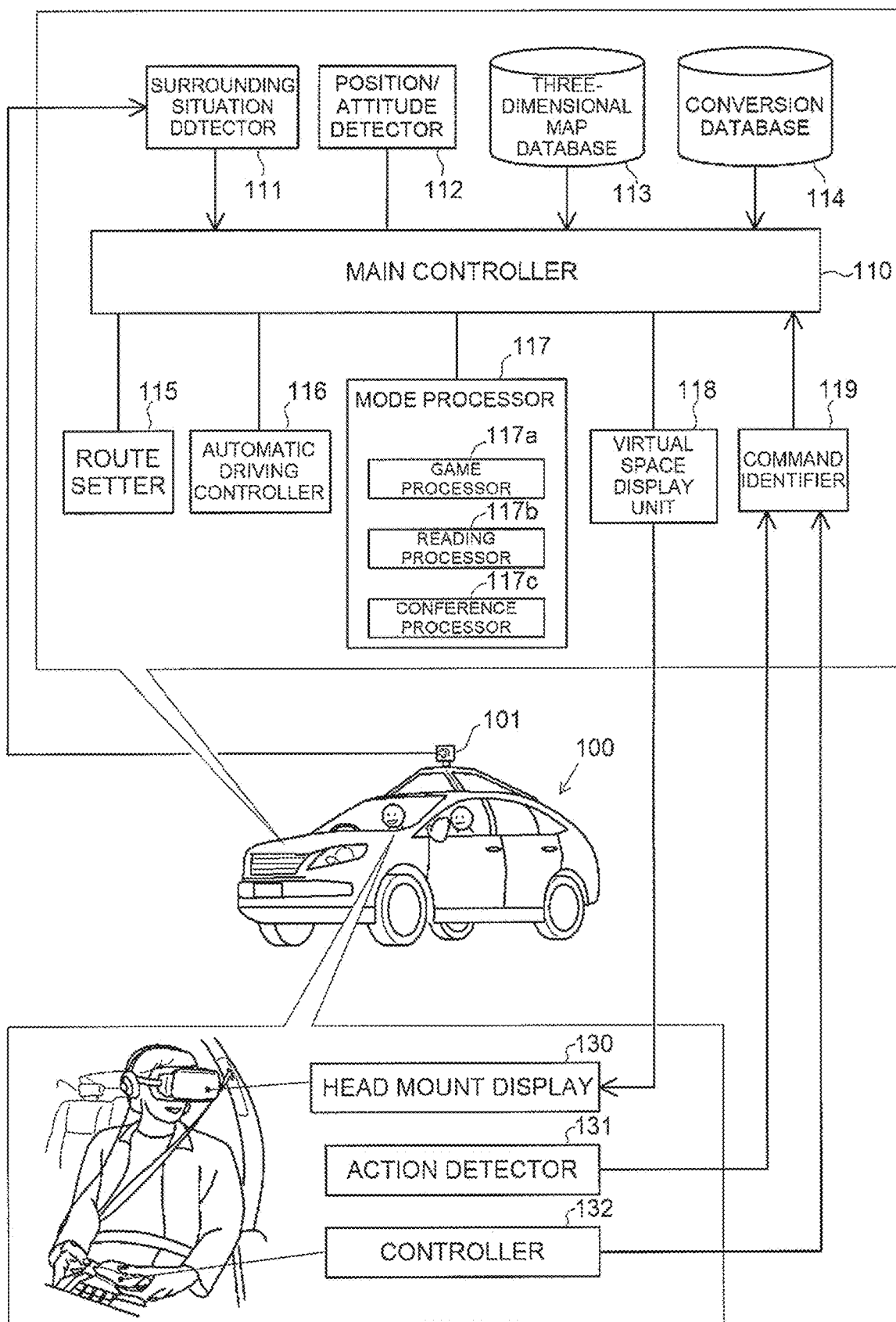
FIG. 2 is a diagram illustrating the configuration of a virtual space display system.

FIG. 2 is a diagram illustrating the configuration of the virtual space display system. According to the embodiment, the virtual space display system is configured by installing a computer program that implements illustrated respective functional blocks and databases into a control device that is mounted on the vehicle 100 and that is configured by a computer including a CPU, a RAM and a ROM. The respective functional blocks and databases may alternatively be provided by a hardware configuration. The system is provided as a standalone system according to the embodiment but may be configured as a system that connects the vehicle 100 with a plurality of servers and the like via a network and that provides part of the illustrated respective functional blocks and databases via the network. The illustrated respective functional blocks and databases include functions to implement automatic driving of the vehicle 100.

The following describes the respective functional blocks and databases.

A three-dimensional map database 113 is a highly accurate three-dimensional map used for automatic driving of the vehicle 100. The three-dimensional map database 113 stores not only the shapes of roads but the locations and the shapes of various features located in the surroundings, for examples, buildings, road signs, traffic lights and guardrails, as three-dimensional models. The three-dimensional map database 113 may store various white lines and the like such as centerlines, stop lines and pedestrians' crossings on the roads.

A conversion database 114 is provided as a database to store objects that are to be displayed in the virtual space, in relation to features located in the real world. The features include not only stationary features such as buildings but moving features such as pedestrians and oncoming vehicles. The contents of the conversion database 114 will be described later concretely.

A main controller 110 serves for integrated control of the entire functions. According to the embodiment, primary functions implemented under control of the main controller 110 are a function of implementing automatic driving of the vehicle 100 and a function of displaying the passenger a virtual space.

The vehicle 100 is provided with a sensor 101 configured to detect various features located in the surroundings. A surrounding situation detector 111 uses the detection result of the sensor 101 to detect the surrounding situation. The sensor used may be any of detection sensors of features using laser, infrared rays and radar and various cameras taking still images and moving pictures alone or in combination. The surrounding situation detector 111 may use the three-dimensional map database 113 as well as the detection result of the sensor 101. Checking the detection result by the sensor 101 against the three-dimensional models stored in the three-dimensional map database 113 enables the types and the sizes of features to be identified with the higher accuracy.

A position/attitude detector 112 detects the position and the attitude of the vehicle 100. The position is expressed by the coordinates of, for example, the latitude, the longitude and the altitude. The attitude may be a moving direction of the vehicle 100 that is expressed by the direction, the azimuth or the like. A pitch angle may be detected as the attitude of the vehicle 100 as needed. For example, a GPS or a geomagnetic sensor may be mounted on the vehicle 100 to detect the position and the attitude. The position/attitude detector 112 may be configured to detect the position and the attitude with the higher accuracy by checking the output of the GPS or the like against the three-dimensional map database 113. The position/attitude detector 112 may additionally use the surrounding situation detector 111. The configuration of identifying various features located in the surrounding of the vehicle 100 and checking the identified features against the three-dimensional map database 113 enables the position and the attitude to be detected with the higher accuracy.

A route setter 115 sets a moving route from a place of departure to a destination (this moving route is simply referred to as "route" in the description hereof) specified by the passenger in automatic driving. Various methods may be employed to set the route. For example, one available procedure may provide a road network database that expresses roads by nodes and links and determine a route by route search based on the road network database. Another available procedure may cause the passenger to specify a driving route manually or orally.

An automatic driving controller 116 controls the power, steering and braking of the vehicle 100 to implement automatic driving of the vehicle 100 along the route specified by the route setter 115. The vehicle 100 drives with avoiding the surrounding features according to the detection results of the surrounding situation detector 111 and the position/attitude detector 112. A track along which the vehicle moves according to the momentarily changing situation, separately from the route specified in advance is called path in the description hereof. As described above, the path is influenced by the presence/absence of features and the motions of the features in the surrounding of the vehicle 100 as well as by the route specified in advance. The moving speed of the vehicle 100 is also influenced by the presence/absence of features and the like. In the description hereof, each feature that has an influence on the path and the moving speed is called an important feature, and the other features are called general features. For example, traffic lights and pedestrians ahead of the vehicle 100 and the bicycle P shown in FIG. 1 correspond to the important features. Buildings on the side of the vehicle 100 and the like correspond to the general features. Each moving feature such as the oncoming vehicle C shown in FIG. 1 that is located in the distance and that has no influence on the path or the moving speed of the vehicle 100 belongs to the general features.

A command identifier 119 identifies a command given by the passenger to the vehicle 100, based on the passenger's action and the like. For example, the command may be entered by the passenger's operation of a controller 132 that is held by the passenger or may be entered by detecting a motion of the passenger's head or arm by an action detector 131.

A virtual space display unit 118 displays a virtual space image on a head mount display 130 which the passenger wears. The display medium used may be a large display or the like placed in front of or on the side of the passenger, in place of the head mount display 130. In the process of displaying the virtual space, the virtual space display unit 118 refers to the conversion database 114, converts each important feature detected in the surrounding of the vehicle 100 into a predetermined object, and displays the object in the virtual space. The shape, the size and the like of each important feature may be changed according to the influence of the important feature on the path and the moving speed. The virtual space display unit 118 performs processing of each general feature according to the display content of the virtual space image. For example, each general feature may be converted into an object by referring to the conversion database 114 like the important feature or may be ignored and not be displayed. The virtual space image may be generated, irrespective of the presence/absence of general features.

This embodiment provides a plurality of display modes of the virtual space image. A mode processor 117 determines the display content in each display mode.

In response to selection of a game as one display mode, a game processor 117a determines the progress of a game and a corresponding game screen. The game processor 117a may generate a background image of the game screen and give an instruction to the virtual space display unit 118 to display the background image.

In response to selection of reading as one display mode, a reading processor 117b controls display of, for example, the contents of a book that is to be displayed in the virtual space and page-turning and enlargement corresponding to the passenger's operation. According to the embodiment, the passenger experiences the motion of the vehicle 100 during reading. The virtual space display in the reading mode accordingly displays an image fit for the motion of the vehicle 100, for example, as a background of a book image. The reading processor 117b may generate such a background image.

In response to selection of a conference as one display mode, a conference processor 117c displays an image of a teleconference in the virtual space. The conference processor 117c may change the visual line of a conference image, enlarge the conference image and display conference materials corresponding to the passenger's operation. According to the embodiment, the passenger experiences the motion of the vehicle 100 during a conference. The virtual space display in the conference mode accordingly displays an image fit for the motion of the vehicle 100, for example, as a background of the conference image. The conference processor 117c may generate such a background image.

B. Conversion Database

Figure 3:
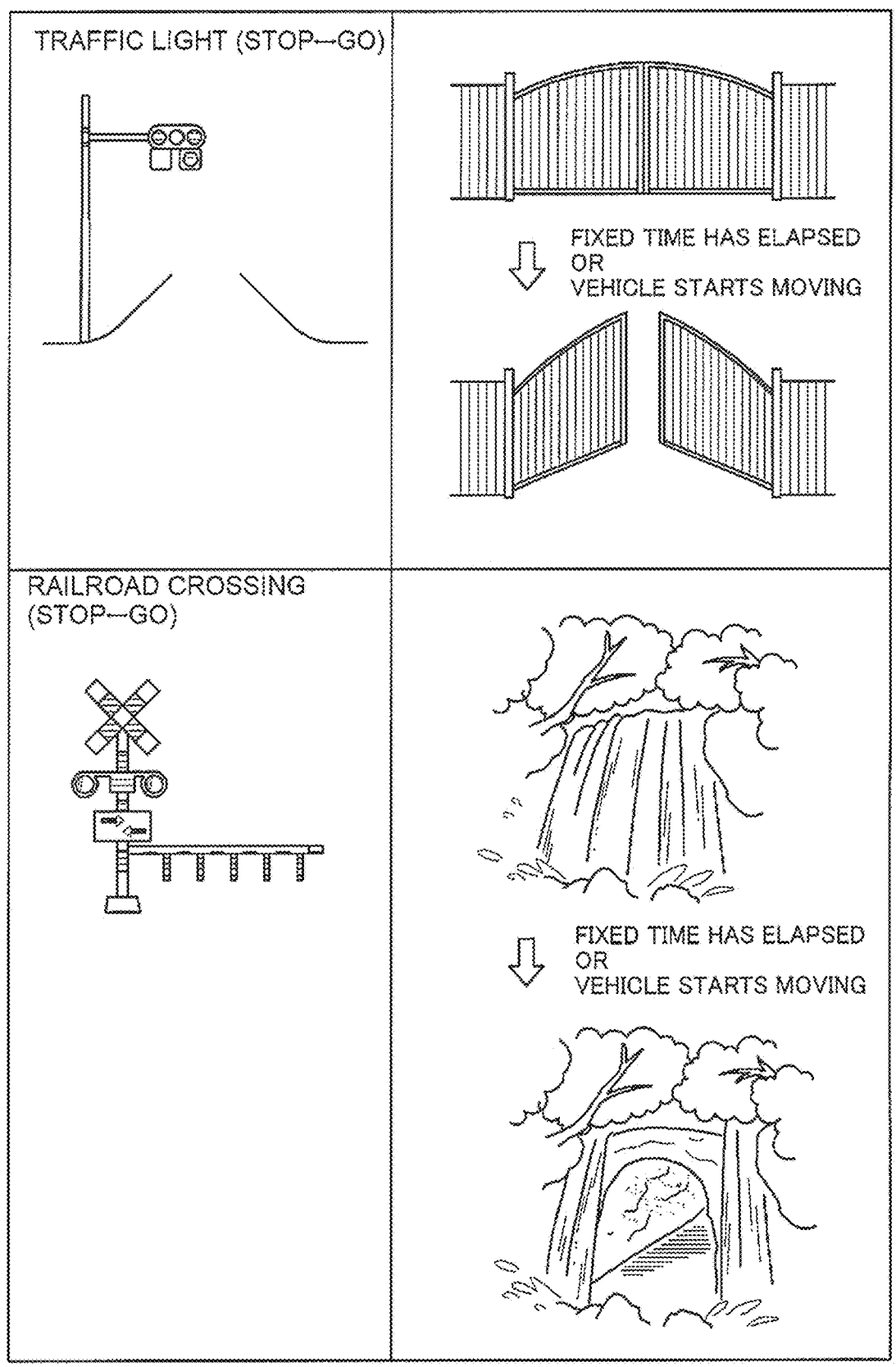
FIG. 3 is a diagram illustrating examples of a conversion database.
Figure 4:
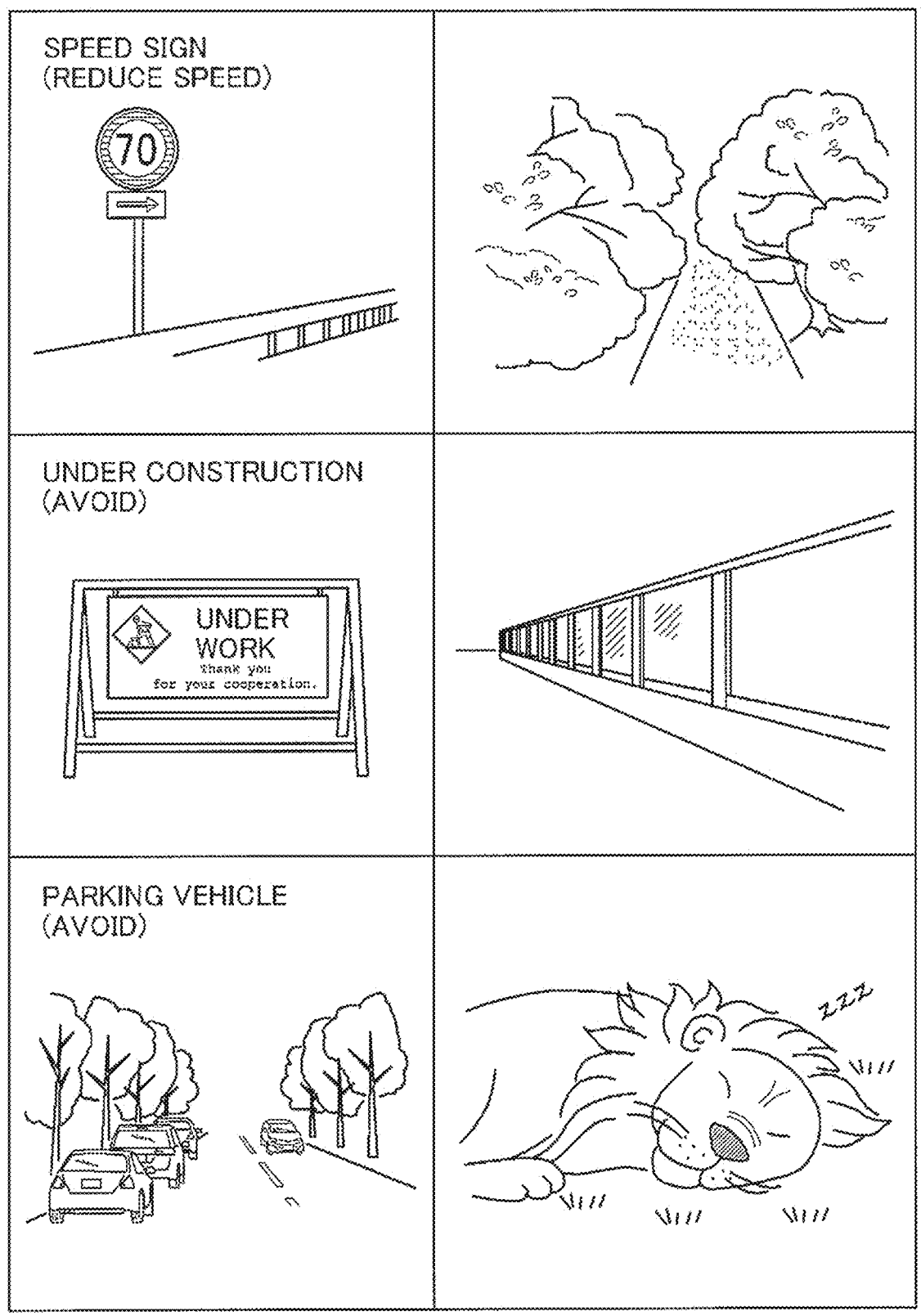
FIG. 4 is a diagram illustrating examples of the conversion database.
Figure 5:
FIG. 5 is a diagram illustrating examples of the conversion database.

The following describes the contents of the conversion database 114. FIGS. 3 to 5 are diagrams illustrating examples of the conversion database 114. As illustrated, the conversion database 114 stores features in the real world (left column) corresponding to objects that are displayed in the virtual space (right column). These examples are only illustrative, and the correspondence relationship may be set arbitrarily. The correspondence relationship between the features and the objects may not be necessarily one-to-one correspondence but may be any of various correspondence relationships, for example, one-to-many correspondence or many-to-one correspondence.

As shown in FIG. 3, an object of a gate is mapped to a traffic light. The influences on the path or the moving speed of the vehicle are shown in parentheses ( ) beside the traffic light. The traffic light alternately has influences of stop (red) and go (green) on the moving speed. In order to give the object corresponding expressions, a closed gate is mapped to stop (red) and an open gate is mapped to go (green). A change between the closed gate and the open gate may be made, for example, when a fixed time has elapsed since the display of a closed gate or when the vehicle starts moving. The color of the traffic light is changed at regular intervals. Changing the object with elapse of a time period enables the situation of the real world to be relatively readily reflected on the object without detecting the color of the traffic light. The configuration of opening the gate when the vehicle starts moving avoids the event of crashing into the closed gate in the virtual space, even when there is a deviation between the time period elapsed before a change of the object and the cycle of a change of the traffic light.

In another example, an object of a waterfall is mapped to a railroad crossing as shown in a lower row of FIG. 3. The railroad crossing is changed between stop or the state that a crossing bar comes down and go or the state that a crossing bar goes up. The state that water falls down across the entire width of the waterfall is mapped to stop, and the state that no water falls down in the middle of the waterfall is mapped to go. A change between these two states of the waterfall may be made, for example, when a fixed time has elapsed since the display of the state that water falls down across the entire width of the waterfall or when the vehicle starts moving.

FIG. 4 illustrates examples of features without change. For example, an object of narrow street is mapped to a speed sign. The speed sign has an impact of reducing the moving speed on the vehicle, whereas the narrow street has a psychological impact of reducing the moving speed on the passenger. Mapping the speed sign to the narrow street allows for display of the virtual space fit for the feature in the real world. The degree of exuberance of trees and the street width of the narrow street may be changed according to the speed limit specified by the speed sign.

An object of a wall is mapped to a barricade for construction. The wall is fit for an influence of avoidance which the barricade has on the path of the vehicle. The length of the wall may be changed according to the area provided with the barricade.

An object of a sleeping lion is mapped to a parked vehicle. The parked car is one type of obstacle and has an influence of avoidance on the path of the vehicle, but is a feature that is likely to move. According to the embodiment, a sleeping lion is mapped to the parked vehicle as the feature that is to be avoided but that is likely to move. In this example, the lion may start walking when the parked car starts moving.

As shown in an upper row of FIG. 5, an object of a hole is mapped to a pedestrian walking ahead of the vehicle. The hole is fit for the pedestrian since both the pedestrian and the hole have an influence of stop or avoidance on the vehicle. The position and the size of the hole may be changed according to the position and the moving speed of the pedestrian.

As shown in a middle row, an object of rolling-down log is mapped to run-out. The run-out has an influence of sudden stop on the vehicle. Mapping an object that causes the passenger to feel endangered to the run-out makes the object fit for the run-out.

As shown in a lower row, an object of a rolling rock is mapped to an oncoming vehicle. The rolling rock is fit for the oncoming vehicle since both the oncoming vehicle and the rock have an influence of avoidance on the path of the vehicle. The size and the moving speed of the rock may be changed according to the size and the moving speed of the oncoming vehicle.

Mapping the objects to the real world as shown by the above examples allows for display of the virtual space according to the influences on the moving speed and the path of the vehicle in the real world. Converting each important feature into a predetermined object by referring to the conversion database enables the passenger viewing the virtual space display to recognize the real world; for example, the passenger who looks at a hole displayed in the virtual space display recognizes that there is a pedestrian in the real world.

C. Control Process

The following describes processes to automatically drive the vehicle and display the virtual space according to the embodiment. The following processes are performed by the control device mounted on the vehicle as the hardware configuration and more specifically processes implemented by the respective functional blocks and databases shown in FIG. 2.

C1. Automatic Driving Process

Figure 6:
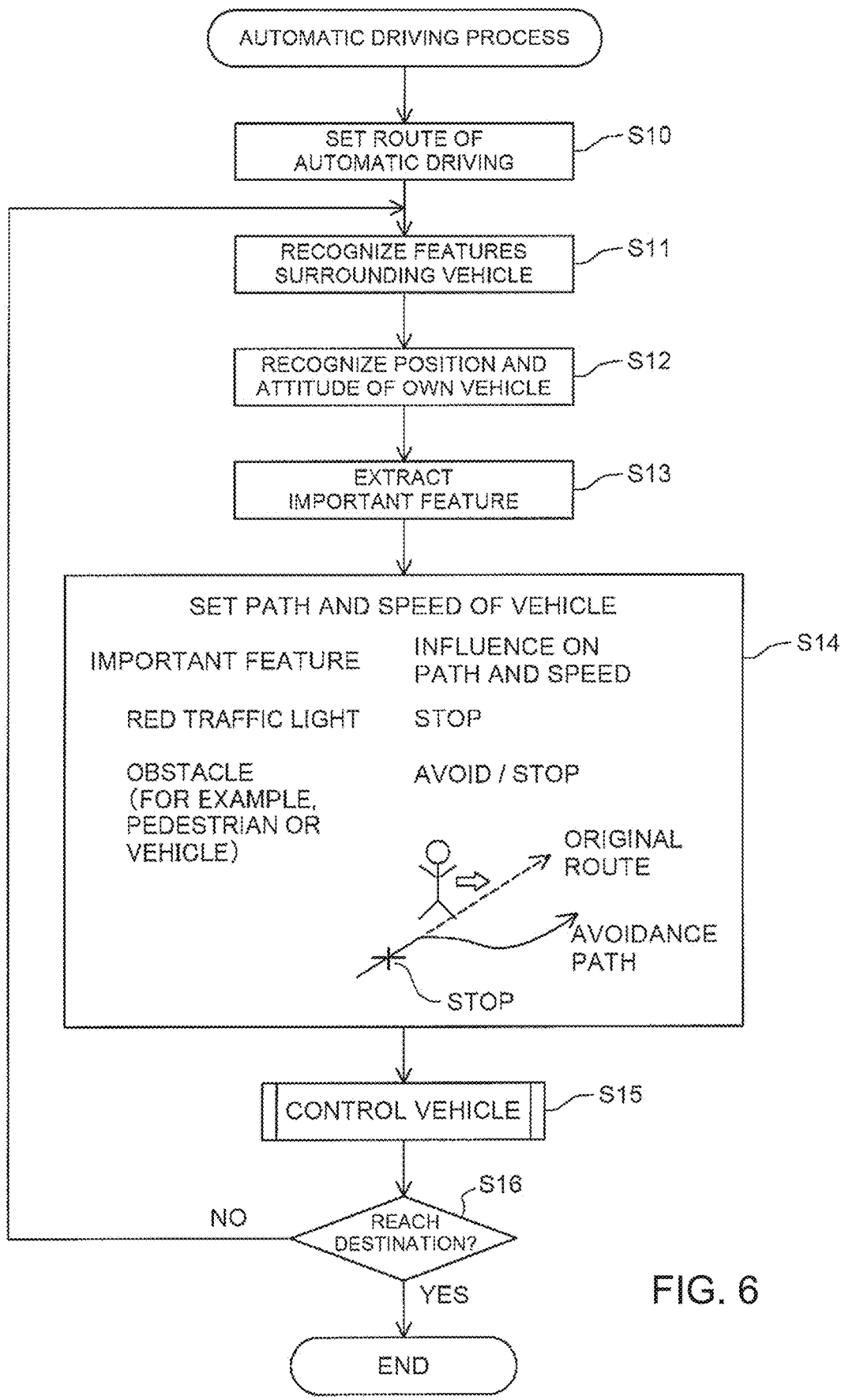
FIG. 6 is a flowchart showing an automatic driving process.

FIG. 6 is a flowchart showing an automatic driving process. The control device first sets a route of automatic driving (step S10). The route may be automatically set by route search from a place of departure to a destination specified by the passenger or may be specified by the passenger's operation of the controller or by the passenger's voice.

After setting the route, the control device starts automatic driving of the vehicle by a procedure described below. The control device recognizes features surrounding the vehicle by checking the detection results of the sensors mounted on the vehicle against the three-dimensional map database (step S11). The control device also recognizes the position and the attitude of the own vehicle by checking the detection results of the sensors including the GPS against the three-dimensional map database and the detection results of features (step S12).

The control device subsequently extracts an important feature, based on these results of recognition (step S13). The important feature denotes a feature that has an influence on the moving speed or the path of the vehicle. Various methods may be employed to extract the important feature. Available methods include, for example, a simple method that specifies all features located in a predetermined area in the moving direction of the vehicle, as important features, a method that specifies various features expected to collide with the vehicle, as important features and a method that specifies features serving to restrict the moving speed of the vehicle such as speed signs and red traffic lights, as important features.

The control device subsequently sets the path and the speed of the vehicle, based on the extracted important feature (step S14). The route along which the vehicle drives has been set in advance. According to the embodiment, the control device sets the path by modifying the route or the like according to the important feature. The outline of an exemplary procedure of setting the path and the speed is shown in the drawing. For example, in the case of extraction of a red traffic light as an important feature, this has an influence of "stop" on the path and the speed of the vehicle. The control device accordingly stops the vehicle or more specifically sets the "speed=0". In the case of extraction of an obstacle such as a pedestrian or another vehicle as an important feature, as illustrated, the vehicle avoids or stops. The control device determines whether the vehicle is to stop or to avoid according to, for example, the distance between the important feature and the own vehicle and the positions of the own vehicle and the important feature and determines an avoidance path deviated from the original route in the case where it is determined that the vehicle is to avoid.

When determining the path along which and the speed at which the vehicle drives as described above, the control device controls the vehicle or more specifically controls a power device, a braking device and a steering device of the vehicle to achieve a drive according to the settings (step S15). The control device repeats the processing of steps S11 to S15 until the vehicle reaches the destination (step S16).

C2. Command Identifying Process

Figure 7:
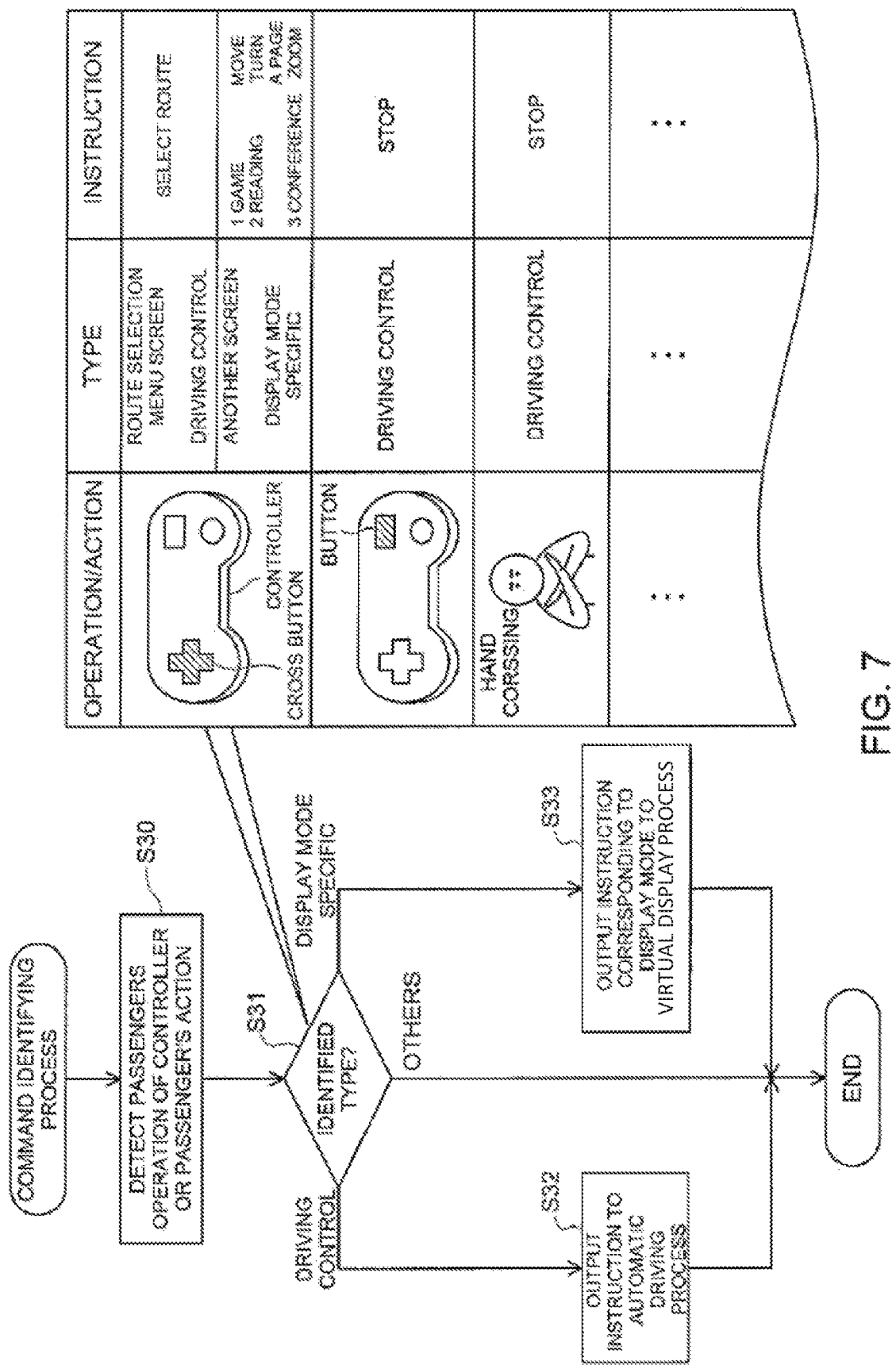
FIG. 7 is a flowchart showing a command identifying process.

FIG. 7 is a flowchart showing a command identifying process. This process is repeatedly performed by the control device, in parallel to the automatic driving process.

When this process is triggered, the control device detects the passenger's operation of the controller or the passenger's action (step S30). When detecting no operation or action (step S31), the control device immediately terminates the command identifying process.

When detecting an operation or an action, the control device performs a process according to the type identified corresponding to the operation or the action (step S31). Examples of identifying the type are shown on the right side of the drawing.

For example, as shown in a first row on the right side of the drawing, in the case of an operation of a cross button (shown by hatching) on the controller, the type differs according to the screen displayed in the virtual space. In the case where a route selection menu screen is displayed, the type is identified as "driving control". An instruction in response to the operation in this case is to select a route among routes displayed in a menu. In the case where another screen is displayed, the type is identified as "display mode specific". An instruction in response to the operation in this case differs depending on the display mode. In the illustrated example, the instruction is to move in the game mode, is to turn a page in the reading mode and is to zoom in the conference mode.

As shown in a second row on the right side of the drawing, in the case of an operation of a button (shown by hatching) on the controller, the type is identified as "driving control", and an instruction is to stop. Setting a specific button on the controller to be mapped to driving control irrespective of the display mode enables this button to serve as an emergency stop button.

As shown in a third row on the right side of the drawing, the type may be identified corresponding to the passenger's action. In the case of the passenger's hand crossing action, the type is identified as "driving control", and an instruction is to stop. Such setting enables the vehicle to have an emergency stop without an operation of the controller. Selecting an action which the passenger is likely to take unconsciously when feeling endangered as the action to give such an instruction enables the passenger to give an instruction by a natural action and improves the safety. The illustrated had crossing action is an example of the action which the passenger is likely to take unintentionally when the passenger encounters a situation of a possible collision with some feature.

The identification of the type corresponding to the operation or the action may be readily performed by providing the illustrated correspondence relationships in the form of a database or the like in advance.

When the type corresponding to the operation or the action is identified as "driving control" (step S31), the control device outputs an instruction corresponding to the operation or the like to the automatic driving process (step S32). The automatic driving process (shown in FIG. 6) controls the vehicle in response to this instruction. For example, the automatic driving process takes into account this instruction in the process of setting the path and the speed of the vehicle (step S14 in FIG. 6).

When the type corresponding to the operation or the action is identified as "display mode specific" (step S31), the control device outputs an instruction corresponding to the display mode to a virtual space display process (step S33). The processing details of the virtual space display process will be described below. The passenger's instruction is to be reflected in the process of generating a virtual space image that is displayed on the head mount display.

The control device repeatedly performs the command identifying process described above, so as to make the passenger's intention reflected on driving of the vehicle or on display of the virtual space.

C3. Virtual Space Display Process

Figure 8:
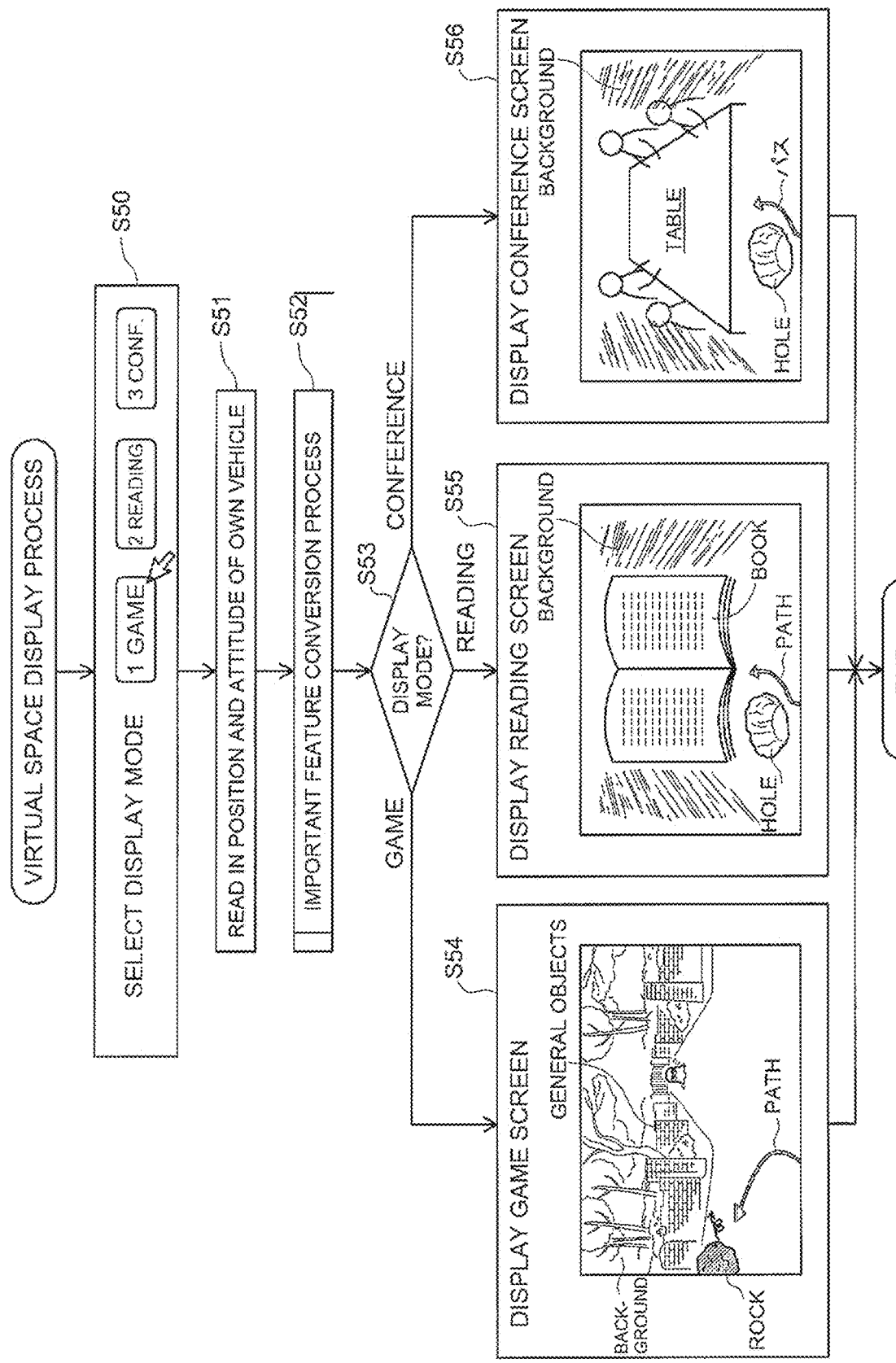
FIG. 8 is a flowchart showing a virtual space display process.

FIG. 8 is a flowchart showing a virtual space display process. This is a process to display an image of a virtual space on the head mount display which the passenger wears. The control device repeatedly performs this process in parallel to the automatic driving process (shown in FIG. 6) and the command identifying process (shown in FIG. 7).

When this process is triggered, the control device selects a display mode (step S50). Like the illustrated example, the control device may display a menu of buttons representing available display modes such as "game", "reading" and "conference" and may allow the passenger to enter the passenger's selection. After the passenger's selection of a display mode, the processing of step S50 may be skipped, or the menu of selecting a display mode may be continuously displayed at an end of the screen or the like to allow the passenger to change of the display mode at an arbitrary timing.

The control device subsequently reads in the position and the attitude of the own vehicle (step S51). The result of recognition in the automatic driving process (as shown in step S12 of FIG. 6) may be used as these pieces of information.

The control device then performs an important feature conversion process (step S52). This is a process of converting each important feature located in the surrounding of the vehicle into an object that is to be displayed in the virtual space, based on the conversion database. The details of this process will be described later.

Subsequent to the above series of processing, the control device displays the virtual space according to the display mode (step S53).

When the display mode is "game", the control device displays a game screen (step S54). A display example of the game screen is illustrated in the drawing. In this screen, a bicycle that is one of important features is converted into and displayed as a rolling rock. General features are converted into objects based on the conversion database to form a background of the game. Accordingly, the game screen provides a path recognizable as a road along which the passenger moves in the virtual space.

The display of the game screen is, however, not limited to this procedure. The general features may not be necessarily converted into objects. The background image of the game screen may thus be generated as an image irrespective of the general features. The background of the game may be, for example, an underwater image. In this case, each important feature is converted into and displayed as a predetermined object, based on the conversion database. The bicycle as an important feature may be converted into, for example, a shark swimming in the water in the background of the game. Such conversion is readily performed by providing a correspondence relationship of the conversion database according to the background image of the game.

When the display mode is "reading", the control device displays a reading screen (step S55). A display example of the reading screen is illustrated in the drawing. In this screen, a book to be read is displayed in the center. In order to improve the reality of virtual space display, an image represents a real book. The passenger turns pages of the book by operations of the controller or the like to enjoy reading. The reading screen display may provide a function of zooming part of reading in response to the passenger's operation. The reading screen displays a scenery changing with motion of the vehicle in the background of the book, with a view to suppressing the passenger from feeling strange during reading when experiencing the motion of the vehicle. An arrow representing a path along which the vehicle moves is also displayed under the book. This enables the passenger to recognize the movement of the vehicle fit for the passenger's own feeling by the naturally visible surrounding image, while paying attention to reading. The passenger can thus continue reading without feeling strange. Important features are also displayed in the reading screen display. In the illustrated example, a hole representing a pedestrian is displayed together with the path. This enables the passenger to understand the reason why the vehicle changes the path by the display of the virtual space and thereby suppresses the passenger from feeling strange. The display of the background image, the path and the important features in the reading screen is not limited to this illustrated example, but any of various displays may be employed.

When the display mode is "conference", the control device displays a conference screen (step S56). A display example of the conference screen is illustrated in the drawing. In this screen, an image of a teleconference is displayed in the center. The image of the teleconference may be an image that is taken by a camera in another conference room in the real world and that is obtained via the network. The conference screen display may provide functions of moving the point of view, of zooming, and changing over to display of conference material in response to the passenger's operations of the controller or the like. The conference screen displays a scenery changing with motion of the vehicle in the background of the conference image. An arrow representing a path along which the vehicle moves is also displayed under the conference image. This enables the passenger to recognize the movement of the vehicle fit for the passenger's own feeling by the naturally visible surrounding image, while having the conference. This accordingly suppresses the passenger from feeling strange. Like the reading screen display, important features are also displayed in the conference screen display. The display of the background image, the path and the important features in the conference screen is not limited to this illustrated example, but any of various displays may be employed.

Figure 9:
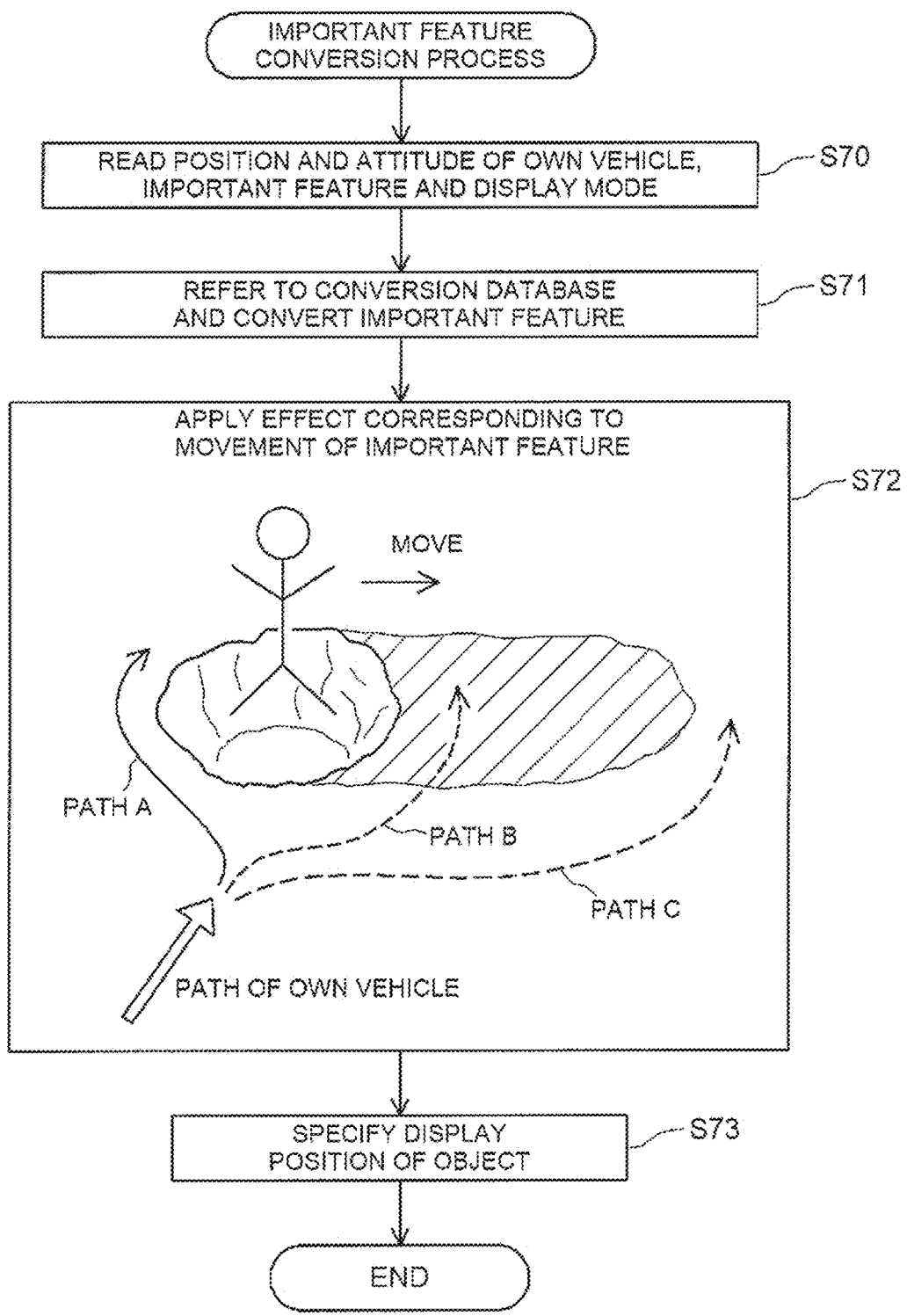
FIG. 9 is a flowchart showing an important feature converting process.

FIG. 9 is a flowchart showing the important feature conversion process. This shows the processing of step S52 in the virtual space display process (shown in FIG. 8). The control device reads the position and the attitude of the own vehicle, each important feature and the display mode (step S70). The control device subsequently refers to the conversion database and converts the important feature into an object that is to be displayed in the virtual space (step S71). The important feature may be converted into different objects according to different display modes.

The control device applies an effect corresponding to the movement of each important feature to the converted object (step S72). An example of the effect is illustrated in the drawing. In this illustrated example, a pedestrian in the real world is converted into an object of a hole. A hole illustrated without hatching denotes the object of the hole stored in relation to the pedestrian in the conversion database. Displaying this object in the virtual space cause the passenger to recognize that a change of the path of the own vehicle is a motion to avoid the hole. The passenger is thus unlikely to feel strange for this motion.

Depending on the position of the hole, however, both a path A and a path B in the drawing may be naturally taken. In this state, while the passenger may look at the hole and expect an avoidance action along the path B, the vehicle may move along the path A. There is accordingly a possibility of a difference between the passenger's recognition and the actual path of the vehicle.

When the pedestrian moves as shown by an arrow in the real world, the hole may be enlarged to be displayed as shown by hatching. Available paths to avoid this enlarged hole are the path A and a detour path C. It is, however, clear that the path A should be naturally taken, based on the position of the own vehicle. The control device detects the movement of the pedestrian as shown by the arrow and accordingly selects the path A as a safe route. Providing the display as shown by hatching enables the passenger's recognition to be fit for the actual movement of the vehicle and advantageously further suppresses the passenger from feeling strange.

The processing of step S72 applies an effect to the object to be fit for the path which the vehicle takes in the real world as described above. Examples of the effect include a change in size and a movement of the object itself, in addition to a change of the shape as illustrated. More specifically, the control device may obtain the path and the speed of the vehicle set in the automatic driving process (as shown in step S14 of FIG. 6) and determine the details of the effect to be fit for the obtained path and speed of the vehicle. Applying the effect is not limited to changing the shape or the like of the object stored in the conversion database but also includes selecting an appropriate mode when a plurality of modes with regard to an object are stored in the conversion database. For example, as shown in the example of a traffic light in FIG. 3, applying the effect may selecting either a closed gate or an open gate.

The control device also specifies the display position of the object set as described above (step S73). The display position may be specified by, for example, coordinates in the virtual space. The position of each important feature in the real world and the position and the attitude of the own vehicle are determined in the automatic driving process (steps S11 and S12 in FIG. 6). The position of the important feature in the virtual space coordinates is thus specified. The object may be displayed to have its center of gravity to be identical with the position of the important feature. When the important feature moves, the center of gravity of the object may be displayed to be shifted from the current location of the important feature, accompanied with the movement of the important feature.

D. Advantageous Effects and Modifications

The virtual space display system of the embodiment described above provides the passenger with display of a virtual space fit for the motion of the vehicle in the real world or more specifically an image explaining the motion of the moving body. As a result, this enables the motion expected by the passenger who looks at the object in the virtual space to match with the path determined by the moving body in response to detection of an important feature in the real world. This results in preventing the passenger who views the virtual space from feeling strange for the motion of the moving body. This also enables the passenger to be absorbed in the virtual space without causing the passenger to wonder what happens in the real world in response to the motion of the moving body. This, on the contrary, causes the motion of the moving body in the real world to be fit for the passenger's feeling in the real world and thereby provides an advantage of improving the reality of the virtual space. The virtual space display system of the embodiment accordingly satisfies both the passenger's concentration in the virtual space and reduction of the passenger's discomfort due to the motion of the real world which the passenger is forced to experience.

The configuration of the above embodiment is not limited to the vehicle of automatic driving but is also applicable to a passenger who is on a vehicle driven by another person. In the latter case, since the driver is on the vehicle, the automatic driving controller 116 configured to control driving of the vehicle (shown in FIG. 2) may be omitted.

Embodiment 2

The following describes a virtual space display system according to Embodiment 2. Embodiment 1 illustrates the example that a person on the moving body moves. Embodiment 2 illustrates an example that a person moves by itself.

Figure 10:
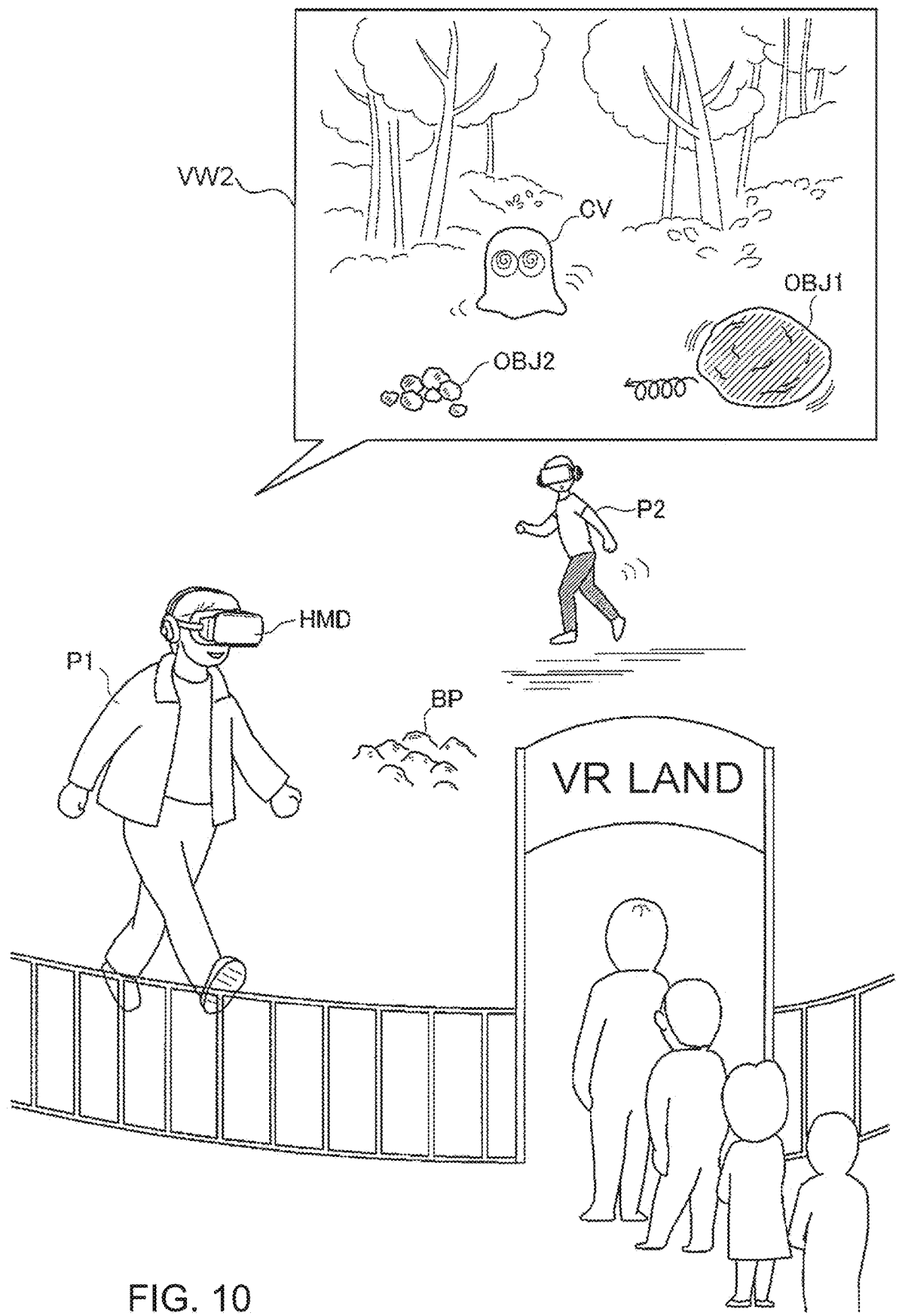
FIG. 10 is a diagram illustrating the outline of virtual space display according to Embodiment 2.

FIG. 10 is a diagram illustrating the outline of virtual space display according to Embodiment 2. This illustrates an example of an attraction in a theme park. In this illustrated example, a player P1 of the attraction who wears a head mount display HMD plays to view a virtual space VW2 and catch a monster CV appearing in the virtual space.

Embodiment 2 has a system configuration similar to that of Embodiment 1 (shown in FIG. 2). The functional blocks required for automatic driving, i.e., the automatic driving controller 116 and the three-dimensional map database 113 may, however, be omitted. Depending on the type of the attraction, the reading processor 117b and the conference processor 117c included in the mode processor 117 may also be omitted. The position/attitude detector 112 may be implemented by mounting a GPS or the like to the head mount display HMD which the player P1 wears or may detect the position of the player P1 by means of cameras and sensors provided in the attraction.

The surrounding situation detector 111 may be implemented by integrating a camera configured to shoot the outside situation with the head mount display HMD. When the positions and the types of obstacles in an area of the play such as the attraction and the positions of other players P2 are known, the surrounding situation detector 111 may use such pieces of information.

The virtual space display system of Embodiment 2 selects a feature that has an influence on the feeling or expectation of a motion of the player P1 by itself among features detected by the surrounding situation detector 111 and displays an object corresponding to the selected feature in the virtual space VW2. In the illustrated example, in response to detection of a bump BP provided on the floor surface ahead of the player P1, a group of small stones OBJ2 is displayed in the virtual space VW2. The player P1 walks on the group of small stones OBJ2 in the virtual space VW2, while actually walking on the bump BP. This accordingly causes the real feeling of the player P1 to match with visual recognition in the virtual space. When another player P2 approaches the player P1, a rolling rock OBJ1 is displayed in the virtual space VW2. The player P1 accordingly expects a danger in moving ahead and stops to avoid the rock. Expecting what happens based on the display in the virtual space VW2 allows the person to avoid the danger in the real world.

As described above, the present disclosure is also applicable to the case where a person who wears the display device moves voluntarily. This provides similar advantageous effects to those of Embodiment 1.

Embodiment 2 illustrates the example of the walking person. The present disclosure may also be applied to a person who wears the head mount display HMD and who drives some moving body. For example, when a driver drives a cart on a very narrow aisle with poor visibility in, for example, a warehouse, the driver's cart moving the aisle and other pedestrians and other cards along with a plan view of the aisle viewed from directly above the aisle may be displayed in a head mount display which the driver wears. This enables the driver to appropriately control and drive the cart like moving in a plane and readily recognize the positions of the other pedestrians and the like. This accordingly ensures safe driving.

The various features described above in Embodiment 1 and in Embodiment 2 may not be necessarily required entirely, but part of the features may be omitted or may be provided in combination as needed. The above embodiments may also have various modified configurations.

For example, according to the embodiment, objects including their changing modes are stored in the conversion database. According to a modification, only objects in their basic shapes may be stored in the conversion database, and all changes of the objects may be processed as effects.

According to the embodiment, the information on the path and the like specified in the automatic driving process is used in the process of applying an effect to an important feature (step S72 in FIG. 9). With regard to an object that regularly changes, such as a traffic light or a railroad crossing, an effect may be applied without using the information obtained in the automatic driving process. An employable method may classify important features into a plurality of groups, for example, based on whether each important feature regularly changes or whether each important feature has an influence of "stop", "avoid (turn)" or "go" on the path or the moving speed of the vehicle, and separately process the classified important features with using the information obtained in the automatic driving process or without using the information. This advantageously reduces the load in the processing of the object that regularly changes, such as a traffic light.

INDUSTRIAL APPLICABILITY

The present disclosure is applicable to provide a passenger on a self-driving moving body with display of a virtual space that is different from a real environment surrounding the moving body.

What is claimed is:

1. A virtual space display system that provides a passenger on a self-driving moving body with display of a virtual space that is different from a real environment surrounding the moving body, the virtual space display system comprising:
  a display device configured to provide the passenger with the display of the virtual space;
  a surrounding situation detector configured to obtain information specifying features that influence a path along which the moving body is to move, and to determine a feature as an important feature from among features located in the surrounding of the moving body, if the feature causes the moving body to stop, slow down, or avoid the feature such that the passenger's feeling of a motion or the passenger's expectation of the motion is influenced; and
  a virtual space display unit configured to convert the important feature into an object based on a predetermined rule, and to cause the display device to display the virtual space including the converted object,
  wherein the converted object provides the passenger with an expectation of stopping, slowing down, or avoiding the converted object in the virtual space such that the passenger's feeling of a motion actually caused by the moving body's stopping, slowing down, or avoiding the important feature matches the passenger's expectation of stopping, slowing down, or avoiding the converted object in the virtual space, wherein the passenger does not expect the motion to be caused without the converted object in the virtual space, while the moving body moves irrespective of the passenger's intention and the passenger has no control of the path of the moving body or a movement of the moving body, and has no control of a movement in the virtual space corresponding to the path of the moving body or the movement of the moving body,
  and wherein the virtual space display unit converts the important feature into the object by referring to a predetermined correspondence relationship according to a type of the important feature such that the converted object is classified in accordance with the type of the important feature.

2. The virtual space display system according to claim 1, wherein the display device is one of a wearable display device which the passenger wears and an immersive display device.

3. The virtual space display system according to claim 1,
wherein the important feature includes a feature having an appearance that changes in such a manner that influences a feeling or expectation of the passenger, and
wherein the virtual space display unit is further configured to predict or detect a change corresponding to the changed appearance of the important feature, the virtual display unit displaying the virtual space including the object with the predicted or detected change reflected on an appearance or a position of the object.

4. The virtual space display system according to claim 1,
wherein the important feature includes a feature having a position that changes in such a manner that influences a feeling or expectation of the passenger, and
wherein the virtual space display unit is further configured to predict or detect a change corresponding to the changed position of the important feature, the virtual display unit displaying the virtual space including the object with the predicted or detected change reflected on an appearance or a position of the object.

5. The virtual space display system according to claim 1, wherein the virtual space display unit converts, in addition to the important feature, at least part of other features that are located in the surrounding of the moving body into at least one second object according to a predetermined rule, and displays the virtual space including the second object.

6. The virtual space display system according to claim 1, wherein the virtual space is a play space where the passenger plays.

7. The virtual space display system according to claim 1, wherein the virtual space display unit is further configured to provide variation to the displayed object within a same classification by maintaining the predetermined correspondence relationship according to the type of the important feature.

8. A virtual space display method that provides a passenger on a self-driving moving body with display of a virtual space that is different from a real environment surrounding the moving body, the virtual space display method comprising computer-implemented steps of:
obtaining information that specifies features that influence a path along which the moving body is to move, and determining a feature as an important feature from among features located in the surrounding of the moving body, if the feature causes the moving body to stop, slow down, or avoid the feature such that the passenger's feeling of a motion or the passenger's expectation of the motion is influenced;
converting the important feature into an object based on a predetermined rule, by referring to a predetermined correspondence relationship according to a type of the important feature such that the converted object is classified in accordance with the type of the important feature; and
causing a display device to display the virtual space including the converted object,
wherein the converted object provides the passenger with an expectation of stopping, slowing down, or avoiding the converted object in the virtual space such that the passenger's feeling of a motion actually caused by the moving body's stopping, slowing down, or avoiding the important feature matches the expectation of stopping, slowing down, or avoiding the converted object in the virtual space, wherein the passenger does not expect the motion to be caused without the converted object in the virtual space, while the moving body moves irrespective of the passenger's intention and the passenger has no control of the path of the moving body or a movement of the moving body, and has no control of a movement in the virtual space corresponding to the path of the moving body or the movement of the moving body.

9. The virtual space display method according to claim 8, further comprising:
providing variation to the displayed object within a same classification by maintaining the predetermined correspondence relationship according to the type of the important feature.

10. A computer readable non-transitory recording medium in which a computer program is recorded, wherein the computer program is performed to provide a passenger on a self-driving moving body with display of a virtual space that is different from a real environment surrounding the moving body, the computer program causing a computer to implement:
a function of obtaining information that specifies features influence a path along which the moving body is to move, and determining a feature as an important feature from among features located in the surrounding of the moving body, if the feature causes the moving body to stop, slow down, or avoid the feature such that the passenger's feeling of a motion or the passenger's expectation of the motion is influenced;
a function of converting the important feature into an object based on a predetermined rule by referring to a predetermined correspondence relationship according to a type of the important feature such that the converted object is classified in accordance with the type of the important feature; and
a function of causing a display device to display the virtual space including the converted object,
wherein the converted object provides the passenger with an expectation of stopping, slowing down, or avoiding the converted object in the virtual space such that the passenger's feeling of a motion actually caused by the moving body's stopping, slowing down, or avoiding the important feature matches the passenger's expectation of stopping, slowing down, or avoiding the converted object in the virtual space, wherein the passenger does not expect the motion to be caused without the converted object in the virtual space, while the moving body moves irrespective of the passenger's intention and the passenger has no control of the path of the moving body or a movement of the moving body, and has no control of a movement in the virtual space corresponding to the path of the moving body or the movement of the moving body.

11. The computer readable non-transitory recording medium according to claim 10, wherein the important feature includes a feature having an appearance that changes in such a manner that influences a feeling or expectation of the passenger, the computer program further causing the computer to implement:
a function of predicting or detecting a change corresponding to the changed appearance of the important feature; and
a function of displaying the virtual space including the object with the predicted or detected change reflected on an appearance or a position of the object.

12. The computer readable non-transitory recording medium according to claim 10, wherein the important feature includes a feature having a position that changes in such a manner that influences a feeling or expectation of the passenger, the computer program further causing the computer to implement:

a function of predicting or detecting a change corresponding to the changed position of the important feature, and displaying the virtual space including the object with the predicted or detected change reflected on an appearance or a position of the object.

13. The computer readable non-transitory recording medium according to claim 10, wherein the computer program further causes the computer to implement:

a function of converting at least part of other features that are located in the surrounding of the moving body into at least one second object according to a predetermined rule; and a function of displaying the virtual space including the second object.

14. The computer readable non-transitory recording medium according to claim 10, wherein the computer program further causes the computer to implement:

a function of providing variation to the displayed object within a same classification by maintaining the predetermined correspondence relationship according to the type of the important feature.

\* \* \* \* \*